United States Patent
Kim et al.

(10) Patent No.: US 11,059,002 B2
(45) Date of Patent: Jul. 13, 2021

(54) PIVOTING GAS/LIQUID DISSOLUTION DEVICE

(71) Applicant: BKT CO., LTD., Daejeon (KR)

(72) Inventors: Jang Kyu Kim, Daejeon (KR); Hyeong Seok Lee, Daejeon (KR); Keun Chan Ryu, Sejong (KR); Jae Gwan Jang, Daejeon (KR)

(73) Assignee: BKT CO., LTD., Dajeon (KR)

( * ) Notice: Subject to any disclaimer, the term of this patent is extended or adjusted under 35 U.S.C. 154(b) by 217 days.

(21) Appl. No.: 16/346,768

(22) PCT Filed: Jun. 19, 2017

(86) PCT No.: PCT/KR2017/006378
§ 371 (c)(1),
(2) Date: May 1, 2019

(87) PCT Pub. No.: WO2018/084402
PCT Pub. Date: May 11, 2018

(65) Prior Publication Data
US 2019/0262782 A1    Aug. 29, 2019

(30) Foreign Application Priority Data
Nov. 2, 2016    (KR) .................. 10-2016-0144866

(51) Int. Cl.
*B01F 3/04*    (2006.01)
*B01D 19/00*    (2006.01)
(Continued)

(52) U.S. Cl.
CPC ........ *B01F 3/0446* (2013.01); *B01D 19/0057* (2013.01); *B01F 3/04* (2013.01);
(Continued)

(58) Field of Classification Search
CPC ...... B01D 19/0057; B01F 3/04; B01F 3/0446; B01F 3/04503; B01F 5/0475; B01F 15/02; B04B 5/10
(Continued)

(56) References Cited

U.S. PATENT DOCUMENTS 2,512,471 A * 6/1950 Trist ........................ D21D 1/22
366/339
2,653,801 A * 9/1953 Fontein et al. ........... C02F 1/72
366/139
(Continued)

FOREIGN PATENT DOCUMENTS

JP    2000166789 A    6/2000
KR    101125851 B1    3/2012
(Continued)

OTHER PUBLICATIONS

Korean Intellectual Property Office, International Search Report of PCT/KR2017/006378 (English Translation) dated Sep. 2017.
(Continued)

*Primary Examiner* — Charles S Bushey
(74) *Attorney, Agent, or Firm* — Duane Morris LLP

(57) ABSTRACT

A gas/liquid dissolution device includes: a dissolution case of a cylindrical shape; an introduction port outside a side surface of the dissolution case, where a dissolution water is introduced into the dissolution case and a different kind of gas is mixed through the introducing port; a gas/liquid separation inducer in the dissolution case, the gas/liquid separation inducer inducing the dissolution water and an insoluble gas introduced into the dissolution case to be separated to a gas and a liquid by a centrifugal force; and a discharge port outside an end portion of the dissolution case. The dissolution water and the insoluble gas are discharged from the dissolution case through the discharge port.

6 Claims, 6 Drawing Sheets

(51) Int. Cl.
  *B01F 5/04* (2006.01)
  *B01F 15/02* (2006.01)
  *B04B 5/10* (2006.01)
(52) U.S. Cl.
  CPC ............ *B01F 5/0475* (2013.01); *B01F 15/02* (2013.01); *B04B 5/10* (2013.01)
(58) Field of Classification Search
  USPC .................................................. 261/76, 79.2
  See application file for complete search history.

(56) References Cited

U.S. PATENT DOCUMENTS

| | | | | |
|---|---|---|---|---|
| 2,705,053 | A * | 3/1955 | Morris | B01D 19/0057 96/212 |
| 3,548,569 | A * | 12/1970 | Jepsen | B04B 5/00 96/228 |
| 3,844,721 | A * | 10/1974 | Cariou | C05B 13/06 422/198 |
| 4,290,791 | A * | 9/1981 | Matsui | B04C 3/00 55/399 |
| 4,726,686 | A * | 2/1988 | Wolf | F02M 19/03 366/165.1 |
| 7,534,354 | B2 * | 5/2009 | Oserod | B01D 17/00 210/703 |
| 8,186,652 | B2 * | 5/2012 | Matsumoto | B01F 3/04978 261/79.2 |
| 8,302,941 | B2 * | 11/2012 | Nakashima | B01F 3/04269 261/64.3 |
| 8,523,151 | B2 * | 9/2013 | Tsuji | B01F 3/0446 261/79.2 |
| 9,486,753 | B1 * | 11/2016 | Vlasak | C02F 3/22 |
| 2013/0113125 | A1 | 5/2013 | Song et al. | |
| 2015/0352505 | A1 | 12/2015 | Yokota et al. | |

FOREIGN PATENT DOCUMENTS

| | | |
|---|---|---|
| KR | 1020130009318 A | 1/2013 |
| KR | 1020140065042 A | 5/2014 |
| KR | 1020140132117 A | 11/2014 |

OTHER PUBLICATIONS

Chinese Intellectual Property Office; Chinese Office Action dated Mar. 11, 2021, for corresponding Chinese Appln. No. 201780073734.4.

Indian Patent Office, Office Action dated Feb. 11, 2021, for corresponding Indian Patent Appln. No. 201917021575.

* cited by examiner

PIVOTING GAS/LIQUID DISSOLUTION DEVICE

CROSS REFERENCE TO RELATED APPLICATIONS

This application is a continuation of International Application No. PCT/KR2017/006378, filed on Jun. 19, 2017, which claims the benefit of priority from Korean Application No. 10-2016-0144866, filed on Nov. 2, 2016, in the Korean Intellectual Property Office, the entire disclosures of each of which are incorporated herein by reference for all purposes.

FIELD

The following description relates to a pivoting gas/liquid dissolution device where a soluble gas is properly dissolved and an insoluble gas is effectively separated from a water.

DESCRIPTION OF RELATED ART

A microbubble generation device generating a bubble of a micro size or a nano size, i.e., a microbubble in a water has been used in various fields including a water treatment field.

In Korean Patent Application No. 10-2013-0009318 (Microbubble Generation Device Using High Dissolution Water Based On Rotation Unit), a technology on a microbubble generation device has been suggested.

In FIG. 1 of the above related art, the microblubble generation device includes a valve 110, a flowmeter 120, a feed pump 130, a venturi injector 140, a rotation unit 150, a separation chamber 160, a dissolution tank 170 and a nozzle unit 180.

According to the related art, a gas and a water are mixed through the venturi injector 140. A dissolution water where the gas and the water are mixed is supplied to the rotation unit 150 and is rotated to increase a solubility of the gas. The dissolution water discharged from the rotation unit 150 is introduced into the dissolution tank 170 through the separation chamber 160.

In the dissolution tank 170, the gas not mixed to the dissolution water is separated and is discharged to an exterior such that only the dissolution water is supplied to the nozzle unit 180. The dissolution water is sprayed through the nozzle unit 180 to generate a microbubble.

Here, the gas and the dissolution water introduced into the dissolution tank 170 are separated up and down and the gas is gathered an upper portion of the dissolution tank 170. When a gas pressure increases over a reference value, a vent, i.e., a value unit corresponding to the upper portion of the dissolution tank 170 becomes open. As a result, a pressure in the dissolution tank 170 is kept constantly.

Accordingly, after the dissolution water is generated by rotating and colliding the water and the gas introduced through the rotation unit 150, the dissolution water is discharged through the nozzle unit 180 to generate the microbubble. As a result, a production rate of the microbubble increases as compared with usage of the water and the gas.

In FIG. 2 of the above related art, the rotation unit 150 receives and rotates a mixture f1 of the water and the air discharged from the venturi injector 140, and discharges a rotated mixture f2 to the separation chamber 160. The rotation unit 150 includes a rotation body 151 receiving the mixture of the water and the air through an introduction portion 153, a rotation inducing guide portion 159 rotating and mixing the introduced water and the introduced air and a dissolution water discharge portion 155 discharging the mixture of the water and the air.

Here, the introduction portion 153 is formed along a tangential direction of the rotation body 151, and the dissolution water discharge portion 155 is formed on a sidewall at a longitudinal central axis of the rotation body 151. A connector 156 supplying the water and the air to the introduction portion 153 is disposed in a region of the introduction portion 153.

The rotation inducing guide portion is formed of a first guide wall body and a second guide wall body of a pipe shape. An end portion of the first guide wall body 159a surrounds a region of the dissolution water discharge portion 155 and is fixed to an inner sidewall surface of the rotation body 151. The other end portion of the first guide wall body 159a is disposed to be spaced apart from the other inner sidewall surface opposite to the inner sidewall surface of the rotation body 151 where dissolution water discharge portion 155 is formed.

The second guide wall portion 159b is disposed outside a radius of the first guide wall portion 159a to be spaced apart from the first guide wall portion 159a. An end portion of the second guide wall portion 159b is fixed to the other inner sidewall surface of the rotation body 151 opposite to the inner sidewall surface of the rotation body 151 where the dissolution water discharge portion 155 is formed. The other end portion of the the second guide wall portion 159b is disposed to be spaced apart from the inner sidewall surface of the rotation body 151 where the dissolution water discharge portion 155 is formed.

Therefore, the water and the air introduced into the rotation body 151 through the introduction portion 153 strongly rotate and collide with each other while moving between the second guide wall portion 159b and an inner surface of the rotation body 151, between the second guide wall portion 159b and the first guide wall portion 159a and inside the second guide wall portion 159b to generate a dissolution water of a high solubility. The generated dissolution water is discharged through the dissolution water discharge portion 155.

When the microbubble is generated by mixing the air and the gas, it is advantageous to generation of the microbubble that a soluble component of a gas component is dissolved in the water. In addition, it is advantageous to generation of the microbubble that an insoluble gas component is separated from the water to be effectively discharged.

When the air is used as the gas, the soluble components (oxygen, nitrogen, carbon dioxide, etc.) among the gas components constituting the air are dissolved in the water, while the insoluble gas components are not dissolved in the water. As a result, it is required that the insoluble gas components are separate and discharged.

However, in the rotation unit according to the related art, although dissolution action where the soluble gas component of the air is dissolved in the water is effectively performed, separation discharge action where the insoluble gas component is separated from the water and is discharged is not effectively performed.

In addition, when the insoluble gas is not separated from and is mixed with the dissolution water during the generation process of the dissolution water, a flow of the dissolution water is not smooth in a flow path from the rotation unit to the dissolution tank through the separation chamber, and a problem such as a pulsation phenomenon may be caused.

DISCLOSURE

Technical Problem

Accordingly, the present description has been made in view of the above-mentioned problems occurring in the prior art, and it is an object of the present description to provide a pivoting gas/liquid dissolution device where a soluble gas is properly dissolved and an insoluble gas is effectively separated from a water.

Technical Solution

To accomplish the above-mentioned object, according to an embodiment of the present disclosure, there is provided a gas/liquid dissolution device including: a dissolution case of a cylindrical shape; an introduction port outside a side surface of the dissolution case, a dissolution water introduced into the dissolution case and a different kind of gas mixed through the introduction port; a gas/liquid separation inducing means in the dissolution case, the gas/liquid separation inducing means inducing the dissolution water and an insoluble gas introduced into the dissolution case to be separated to a gas and a liquid by a centrifugal force; and a discharge port outside an end portion of the dissolution case, the dissolution water and the insoluble gas discharged from the dissolution case through the discharge port.

The introduction port includes: an introduction tube connected to the dissolution case; an insertion tube inserted into the introduction tube by a predetermined length to constitute an overlap section; and a plurality of intake tubes connected to the overlap section on a side surface of the insertion tube.

The discharge port is disposed aligned to a longitudinal central line of the dissolution case, a discharge flow path communicating with an interior of the dissolution case is formed in the discharge port, and a diameter of the discharge flow path increases toward a discharge direction.

The gas/liquid separation inducing means includes: a first gas/liquid separation guide tube having a cylindrical shape concentric with the longitudinal central line of the dissolution case, one side end portion of the first gas/liquid separation guide tube contacting an end surface of a discharge portion of the dissolution case and an other side end portion of the first gas/liquid separation guide tube spaced apart from an opposite end surface of the dissolution case; and a second gas/liquid separation guide tube having a cylindrical shape surrounding the first gas/liquid separation guide tube, one side end portion of the second gas/liquid separation guide tube spaced apart from the end surface of the discharge portion of the dissolution case and an other side end portion of the second gas/liquid separation guide tube contacting the opposite end surface of the dissolution case.

A guide channel is formed on each of the first gas/liquid separation guide tube and the second gas/liquid separation guide tube, and the insoluble gas introduced into the dissolution case is separated from the dissolution water to concentrically flow by the guide channel.

The guide channel on each of the first gas/liquid separation guide tube and the second gas/liquid separation guide tube has a groove shape with a predetermined depth.

The guide channel on the first gas/liquid separation guide tube has a spiral shape wrapping an outer surface of the first gas/liquid separation guide tube and continuously connected, and the guide channel on the second gas/liquid separation guide tube has a spiral shape wrapping an outer surface of the second gas/liquid separation guide tube and continuously connected.

Advantageous Effects

According to an embodiment of the present disclosure, the soluble gas is effectively dissolved in the dissolution water due to the structure of the introduction port, and the different kinds of the soluble gases are easily introduced.

In addition, since the guide channel is formed on the outer surface of the first gas/liquid separation guide tube and the second gas/liquid separation guide tube constituting the gas/liquid separation inducing means, the insoluble gas which is not dissolved in the dissolution water is rotated and flows in the dissolution case, and the insoluble gas is introduced into the guide channel due to the centrifugal force to flow along the guide channel.

Accordingly, the dissolution ability of the soluble gas is improved and the separation ability of the insoluble gas is also improved. As a result, the dissolution water including the microbubble is effectively generated, and a phenomenon that the flow state of the dissolution water is deteriorated by the insoluble gas is prevented.

DETAILED DESCRIPTION

Hereinafter, an explanation on a structure of a pivoting gas/liquid dissolution device according to the present description will be in detail given with reference to the attached FIGS. 3 to 6.

Figure 3:
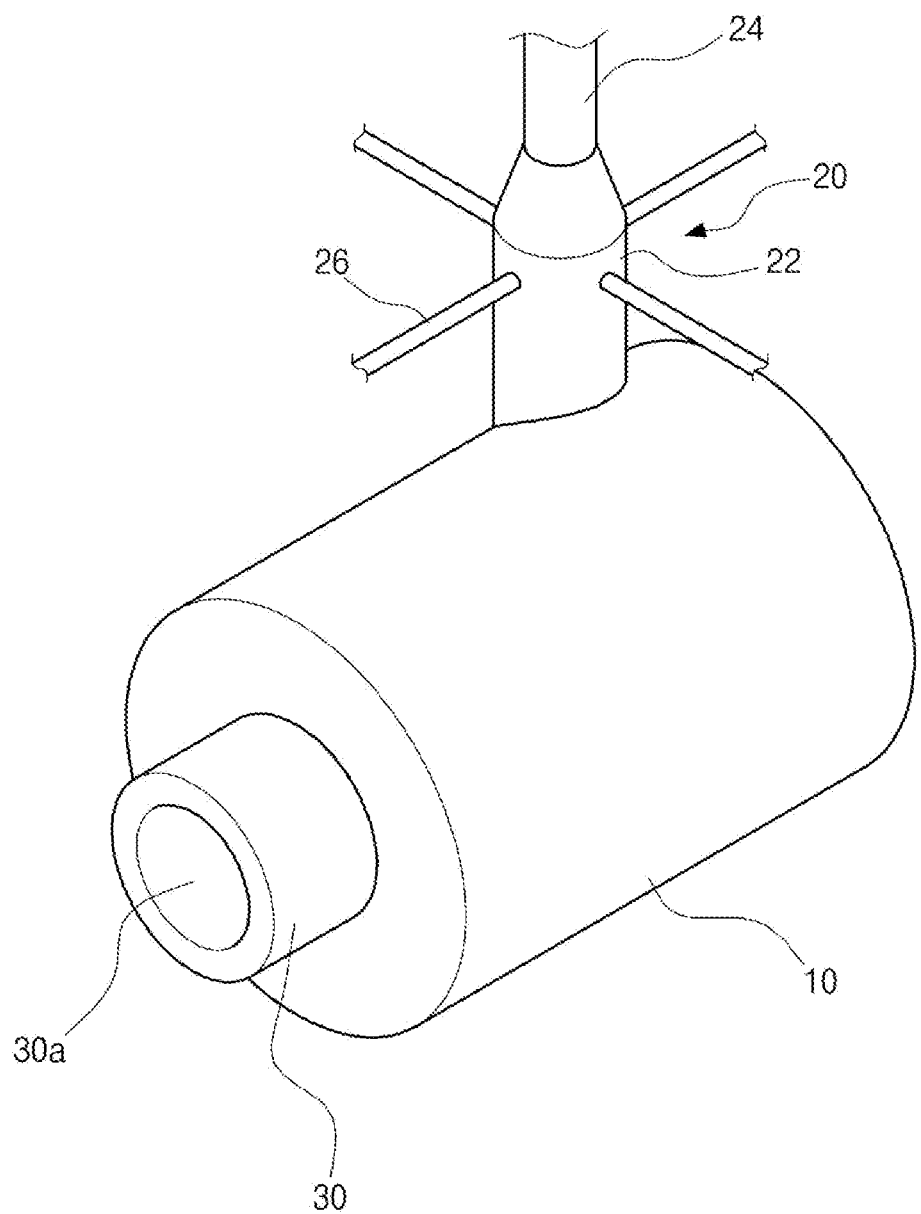
FIG. 3 is a perspective view showing a pivoting gas/liquid dissolution device according to an embodiment of the present description.
Figure 4:
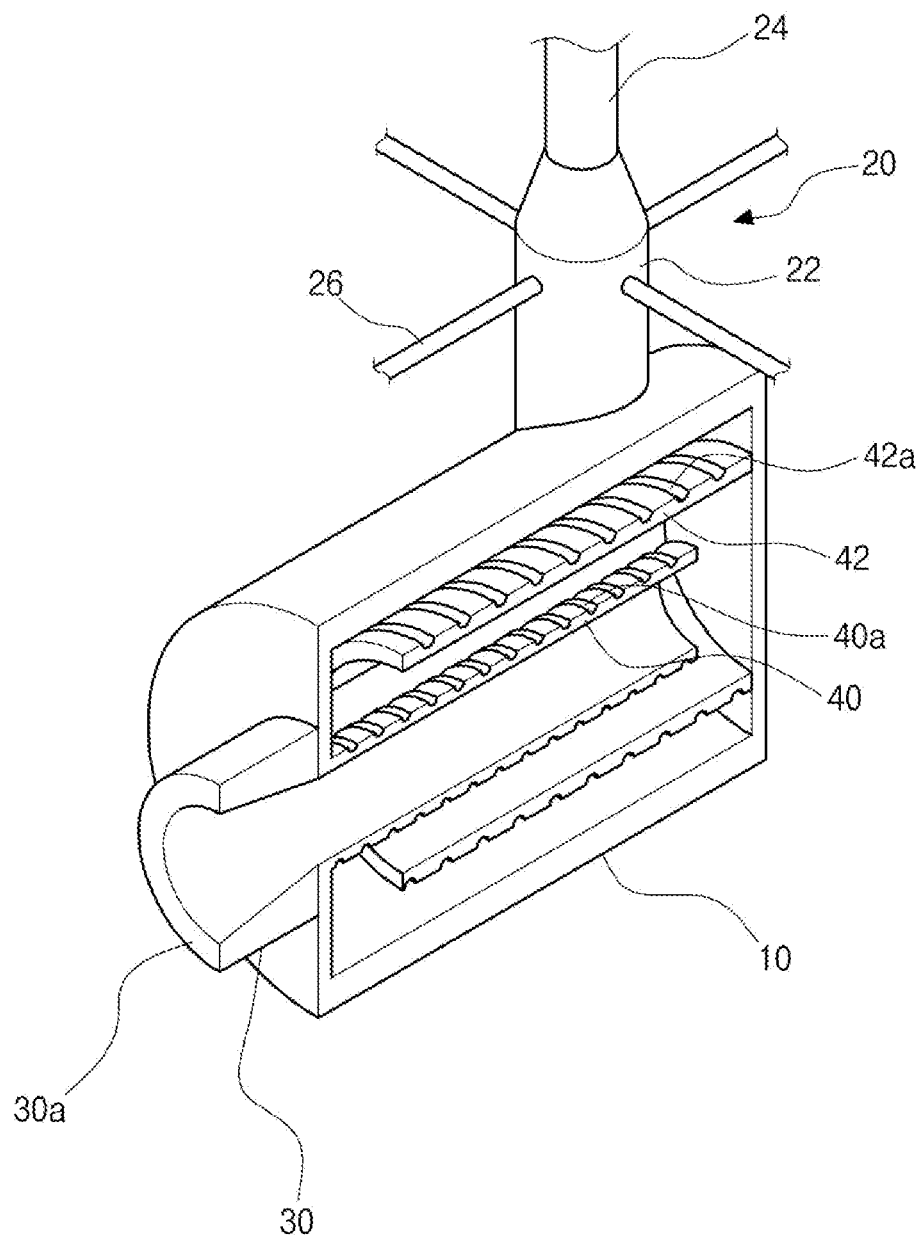
FIG. 4 is a cross-sectional perspective view an inner structure of a pivoting gas/liquid dissolution device according to an embodiment of the present description.
Figure 5:
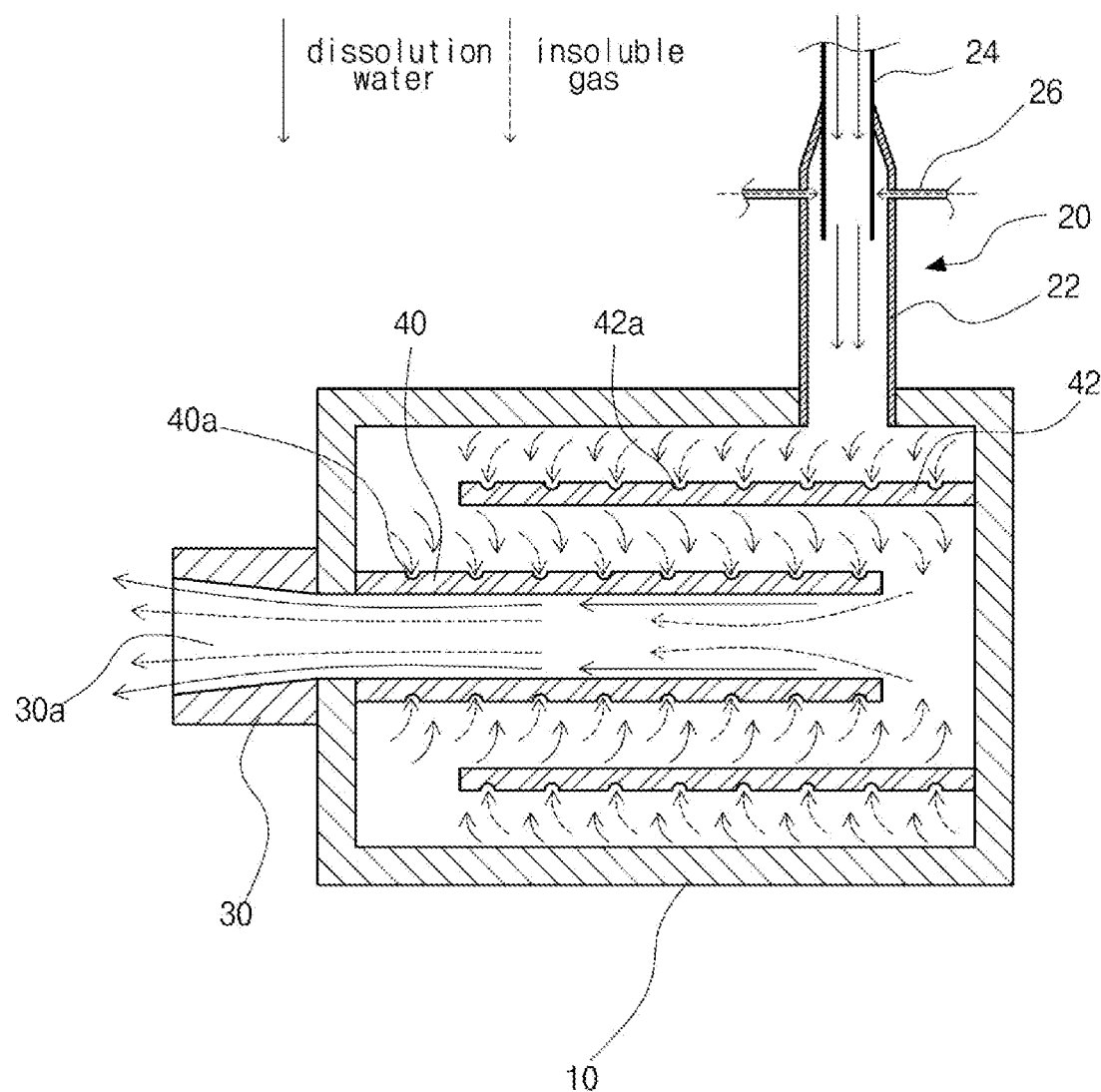
FIG. 5 is a longitudinal cross-sectional view showing a dissolution water and a flow state of a gas in an embodiment of a pivoting gas/liquid dissolution device according to an embodiment of the present description.
Figure 6:
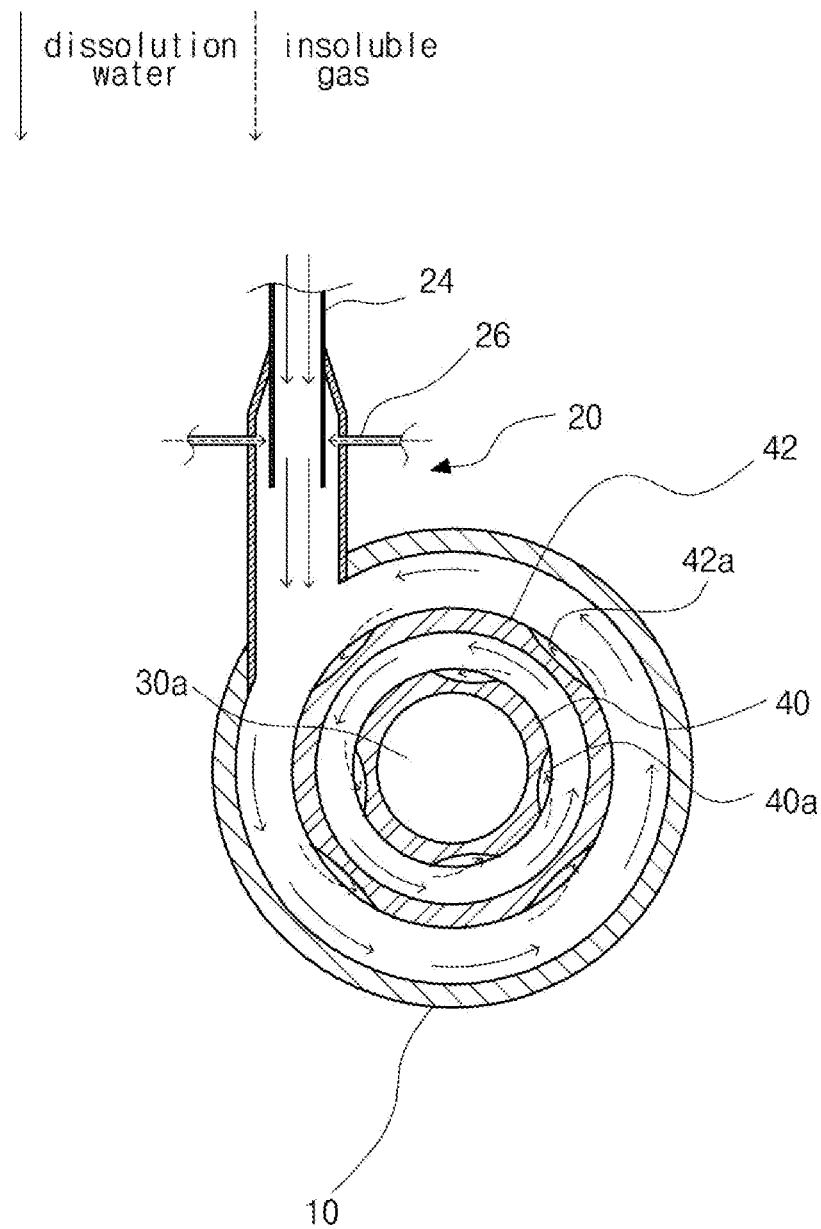
FIG. 6 is a transverse cross-sectional view showing a dissolution water and a flow state of a gas in an embodiment of a pivoting gas/liquid dissolution device according to an embodiment of the present description.

In FIGS. 3 and 4, a pivoting gas/liquid dissolution device according to the present description includes a dissolution case 10 of a cylindrical shape, an introduction port 20 outside a side surface of the dissolution case 10 where a dissolution water is introduced into the dissolution case 10 and a different kind of gas is mixed, a gas/liquid separation inducing means in the dissolution case 10 which induces the dissolution water and an insoluble gas introduced into the dissolution case 10 to be separated to a gas and a liquid by a centrifugal force, and a discharge port 30 outside an end portion of the dissolution case 10 where the dissolution water and the insoluble gas are discharged from the dissolution case 10.

The introduction port 20 includes an introduction tube 22 connected to the dissolution case 10, an insertion tube 24 inserted into the introduction tube 22 by a predetermined length to constitute an overlap section, and a plurality of intake tubes 26 connected to the overlap section on a side surface of the insertion tube 24.

In addition, the introduction tube 22 is disposed adjacent to a tangential direction (a tangential direction of a circle when a cross-section of the dissolution case is regarded as one circle).

The discharge port 30 is disposed aligned to a longitudinal central line of the dissolution case 10, and a discharge flow path 30a communicating with an interior of the dissolution case 10 is formed in the discharge port 30. A diameter of the discharge flow path 30a increases toward an outer direction.

The gas/liquid separation inducing means includes a first gas/liquid separation guide tube 40 having a cylindrical shape concentric with the longitudinal central line of the dissolution case 10 and a second gas/liquid separation guide tube 42 having a cylindrical shape surrounding the first gas/liquid separation guide tube 40. One side end portion of the first gas/liquid separation guide tube 40 contacts an end surface of a discharge portion of the dissolution case 10 and the other side end portion of the first gas/liquid separation guide tube 40 is spaced apart from an opposite end surface of the dissolution case 10. One side end portion of the second gas/liquid separation guide tube 42 is spaced apart from the end surface of the discharge portion of the dissolution case and the other side end portion of the second gas/liquid separation guide tube 42 contacts the opposite end surface of the dissolution case 10.

In addition, guide channels 40a and 42a where the insoluble gas introduced into the dissolution case 10 is separated from the dissolution water and concentrically flows are formed on the first gas/liquid separation guide tube 40 and the second gas/liquid separation guide tube 42, respectively. The guide channel 40a on the first gas/liquid separation guide tube 40 and the guide channel 42a on the second gas/liquid separation guide tube 42 have a groove shape with a predetermined depth in a cross-sectional view.

Further, the guide channel 40a on the first gas/liquid separation guide tube 40 has a spiral shape wrapping an outer surface of the first gas/liquid separation guide tube 40 and continuously connected, and the guide channel 42a on the second gas/liquid separation guide tube 42 has a spiral shape wrapping an outer surface of the second gas/liquid separation guide tube 42 and continuously connected.

For example, an inner diameter of the first gas/liquid separation guide tube 40 may be the same as a diameter of the discharge flow path 30a of the discharge port 30.

Action of the pivoting gas/liquid dissolution device according to the present description will be illustrated hereinafter. (FIGS. 5 and 6) (The dissolution water is designated by a solid line arrow, and the insoluble gas is designated by a dotted line arrow.)

Figure 1:
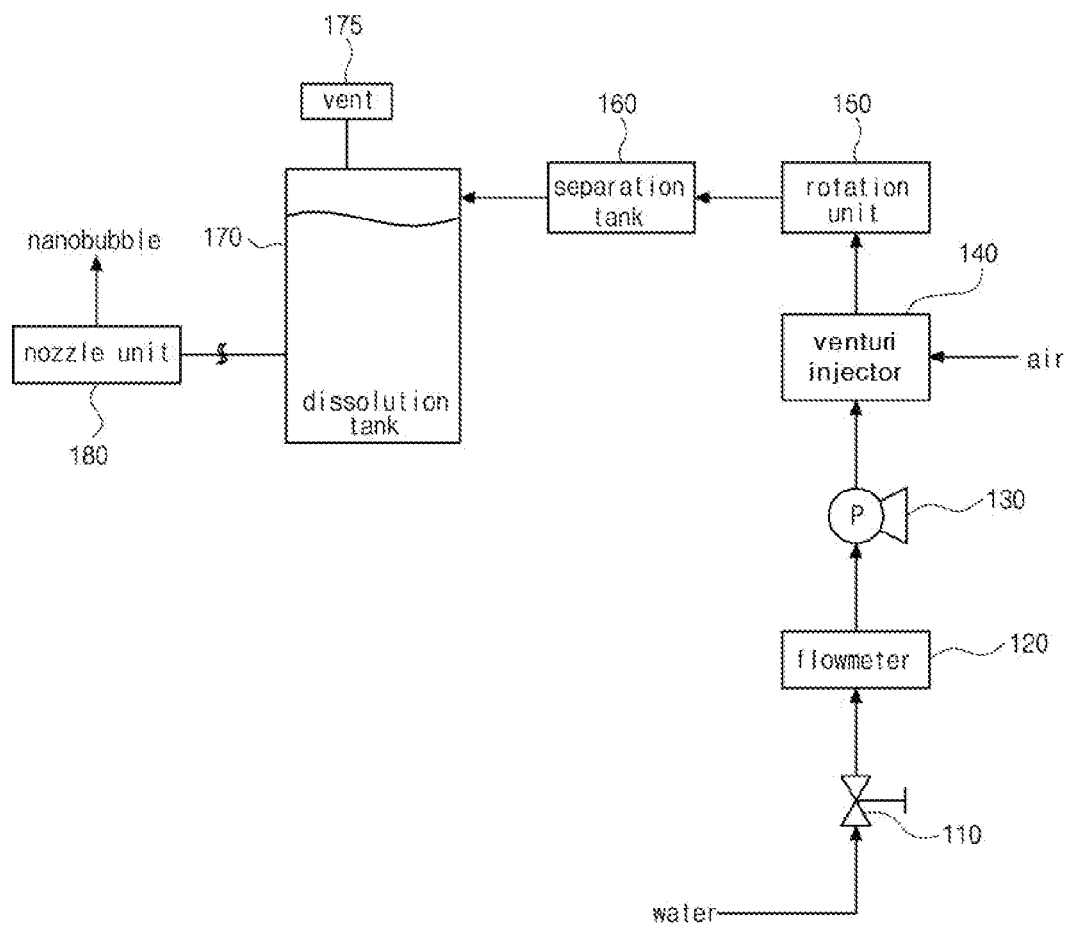
FIG. 1 is a view showing a microbubble generation device according to the related art.
Figure 2:
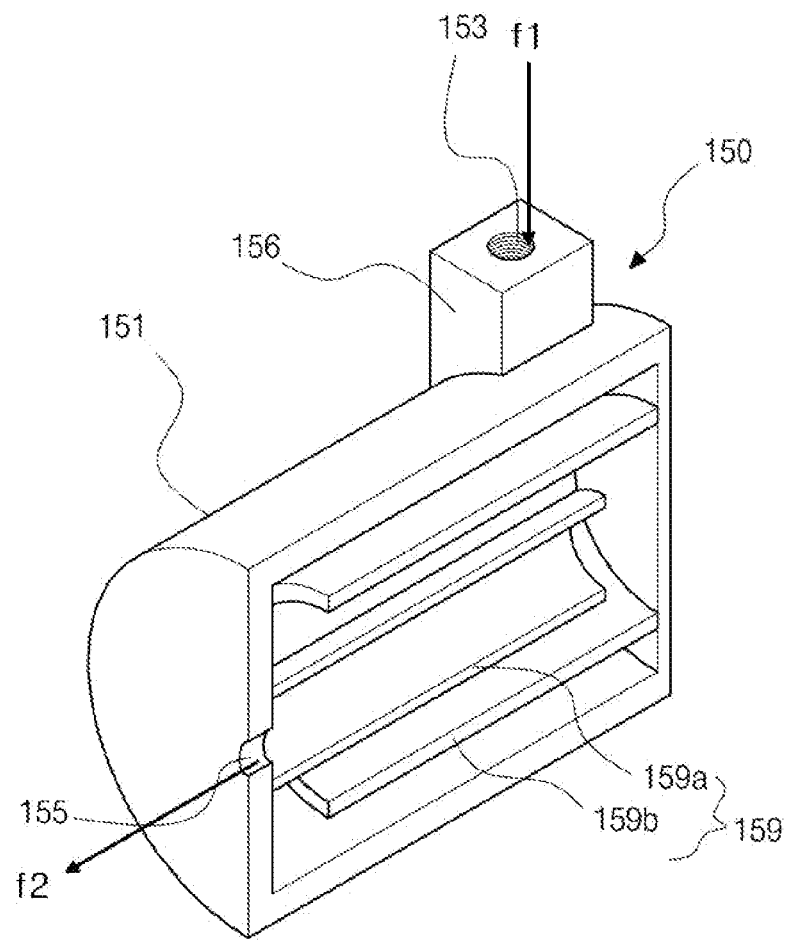
FIG. 2 is a cross-sectional perspective view showing a rotation nozzle of a microbubble generation device according to the related art.

The dissolution water supplied from a venturi injector 140 (of FIG. 1) through a tube passes through the insertion tube 24 of the introduction port 20 and flows to the introduction tube 22. The dissolution water is introduced into the dissolution case 10 through the introduction tube 22. The insoluble gas as well as the dissolution water is introduced into the dissolution case 10.

In addition, the soluble gas is supplied through the respective intake tube 26 at the same time. The supplied soluble gas is sprayed to a gap between the insertion tube 24 and the introduction tube 22 such that the soluble gas collides with the outer surface of the insertion tube 24 to be dispersed and then is mixed with the dissolution water to flow along the flow path in the dissolution case 10.

Since the gas from the intake tube 26 is not directly sprayed to the dissolution water and is mixed to the introduction tube 22 by the flow of the dissolution water in a state where the gas is sprayed to the gap between the insertion tube 24 and the introduction tube 22 to be diffused, solubility of the soluble gas and the dissolution water increases.

Here, the different kinds of soluble gases may be supplied through the respective intake tube 26.

In addition, the dissolution water introduced into the dissolution case 10 rotates along the outer surface of the second gas/liquid separation guide tube 42 due to the structure that the introduction port 20 is disposed along the tangential direction of the dissolution case 10. During the rotation, the insoluble gas introduced into the dissolution case together with the dissolution water begins to be separated from the dissolution water by a centrifugal force.

The dissolution water having a relatively greater specific gravity as compared with the gas is gathered at an outer portion in the dissolution case 10 due to the centrifugal force, and the insoluble gas having a relatively smaller specific gravity is gathered at a central portion, i.e., an outer surface portion of the second gas/liquid separation tube 42 in the dissolution case 10.

The insoluble gas gathered at the outer surface portion of the second gas/liquid separation tube 42 is introduced into and flows along the guide channel 42a of the second gas/liquid separation tube 42. The insoluble gas continuously flows along an outer surface portion of the first gas/liquid separation guide tube 40 through a gap between the second gas/liquid separation tube 42 and the dissolution case 10.

The dissolution water and the insoluble gas flowing along the outer surface of the first gas/liquid separation guide tube 40 are discharged to an exterior of the dissolution case 10 through the discharge port 30. The insoluble gas flows along the guide channel 40a of the first gas/liquid separation guide tube 40 in a state that the insoluble gas is separated from the dissolution water.

In addition, the dissolution water and the insoluble gas are diffused due to the shape of the discharge flow path 30a of the discharge port 30 (the diameter increases toward the discharge direction) while the dissolution water and the insoluble gas are discharged from the dissolution case 10. As a result, the state that the insoluble gas and the dissolution water are separated from each other is effectively kept.

After the dissolution water and the insoluble gas discharged from the pivoting gas/liquid dissolution device are introduced to the dissolution tank through the separation chamber, the insoluble gas is discharged to the exterior of the dissolution tank, and the dissolution water separated from the insoluble gas is supplied.

What is claimed is:

1. A gas/liquid dissolution device comprising:
   a dissolution case of a cylindrical shape;
   an introduction port outside a side surface of the dissolution case, a dissolution water introduced into the dissolution case and a different kind of gas mixed through the introduction port;
   a gas/liquid separation inducing means in the dissolution case, the gas/liquid separation inducing means inducing the dissolution water and an insoluble gas introduced into the dissolution case to be separated to a gas and a liquid by a centrifugal force; and a discharge port outside an end portion of the dissolution case, the dissolution water and the insoluble gas discharged from the dissolution case through the discharge port, wherein the gas/liquid separation inducing means comprises, a first gas/liquid separation guide tube having a cylindrical shape concentric with the longitudinal central line of the dissolution case, one side end portion of the first gas/liquid separation guide tube contacting an end surface of a discharge portion of the dissolution case and an other side end portion of the first gas/liquid separation guide tube spaced apart from an opposite end surface of the dissolution case, and a second gas/liquid separation guide tube having a cylindrical shape surrounding the first gas/liquid separation guide tube, one side end portion of the second gas/liquid separation guide tube spaced apart from the end surface of the discharge portion of the dissolution case and an other aide end portion of the second gas/liquid separation guide tube contacting the opposite end surface of the dissolution case, and wherein a guide channel is disposed on each of the first gas/liquid separation guide tube and the second gas/liquid separation guide tube, and the insoluble gas introduced into the dissolution case is separated from the dissolution water to concentrically flow by the guide channel.

2. The gas/liquid dissolution device according to claim 1, wherein the introduction port comprises:

an introduction tube connected to the dissolution case;

an insertion tube inserted into the introduction tube by a predetermined length to constitute an overlap section; and a plurality of intake tubes connected to the overlap section on a side surface of the insertion tube.

3. The gas/liquid dissolution device according to claim 1, wherein the discharge port is disposed aligned to a longitudinal central line of the dissolution case, wherein a discharge flow path communicating with an interior of the dissolution case is formed in the discharge port, and wherein a diameter of the discharge flow path increases toward a discharge direction.

4. The gas/liquid dissolution device according to claim 1, wherein the guide channel on each of the first gas/liquid separation guide tube and the second gas/liquid separation guide tube has a groove shape with a predetermined depth.

5. The gas/liquid dissolution device according to claim 4, wherein the guide channel on the first gas/liquid separation guide tube has a spiral shape wrapping an outer surface of the first gas/liquid separation guide tube and continuously connected, and wherein the guide channel on the second gas/liquid separation guide tube has a spiral shape wrapping an outer surface of the second gas/liquid separation guide tube and continuously connected.

6. The gas/liquid dissolution device according to claim 3, wherein an inner diameter of the first gas/liquid separation guide tube is a same as a diameter of the discharge flow path.

* * * * *